Figure 1:
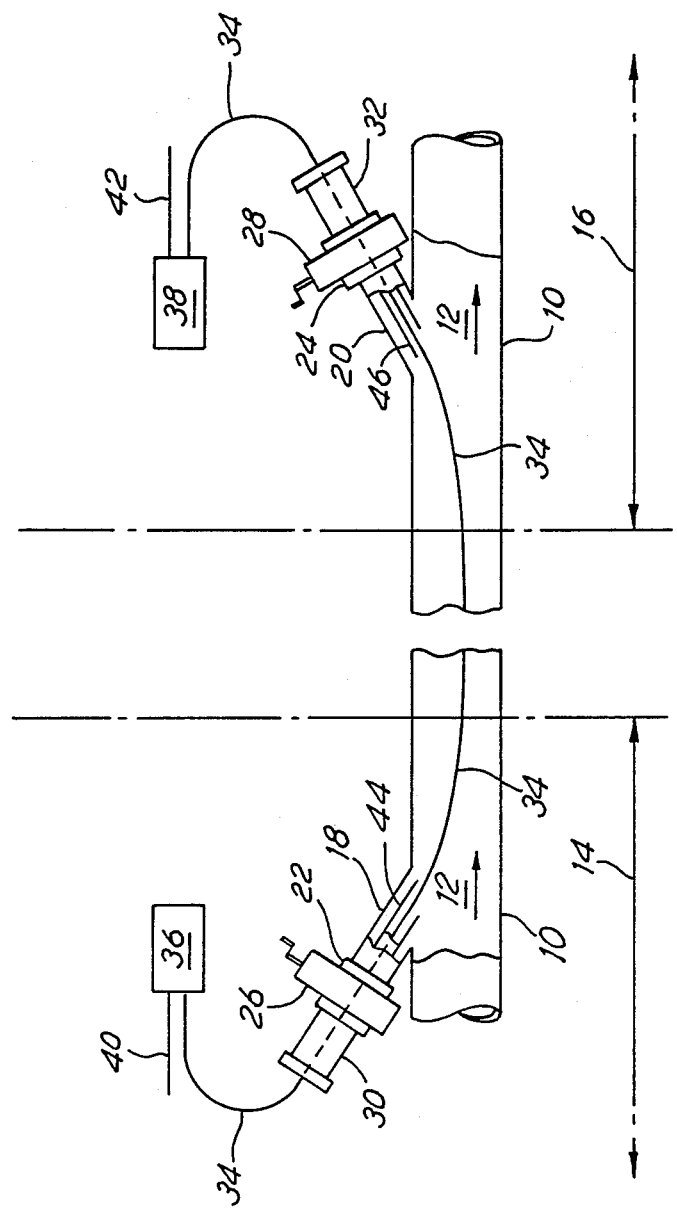

United States Patent [19]

Grocott et al.

[11] Patent Number: 4,856,937
[45] Date of Patent: Aug. 15, 1989

[54] PIPELINE SYSTEMS

[75] Inventors: Geoffrey J. Grocott, Haslemere; Ralph E. J. Baskett, Harlow, both of United Kingdom

[73] Assignee: British Pipeline Agency Limited and STC PLC, London, England

[21] Appl. No.: 201,691

[22] Filed: Jun. 2, 1988

[30] Foreign Application Priority Data

Jun. 4, 1987 [GB] United Kingdom ................. 8713068

[51] Int. Cl.4 .......................... B65H 59/00; F16L 1/00
[52] U.S. Cl. .................................... 405/154; 254/134.4
[58] Field of Search ....................... 405/154, 156, 157; 254/134.4, 134.3 R, 134.3 FT, 134.3 SC

[56] References Cited

U.S. PATENT DOCUMENTS

| | | | |
|---|---|---|---|
| 920,455 | 5/1909 | Greenan | 254/134.4 |
| 1,658,887 | 2/1928 | Dotzauer | 254/134.4 X |
| 2,930,584 | 3/1960 | Hensley et al. | 254/134.3 FT |
| 3,034,766 | 5/1962 | Hamrick | 254/134.4 |
| 4,756,510 | 7/1988 | Klamm et al. | 405/154 X |

Primary Examiner—Dennis L. Taylor
Attorney, Agent, or Firm—Christie, Parker & Hale

[57] ABSTRACT

A method of deploying a cable or other line in a fluid transportation pipeline while in normal operation full of and transporting a fluid under a positive pressure. A collapsible centralizing device is attached to the leading end of the cable and is then fed in a collapsed state into the pipeline via a first fluid sealing means at the cable entry position. That device maintains the cable end centralized in the pipeline cross section while the cable is fed into the pipeline. Magnetic sensing means disposed near the cable exit position sense the presence of the cable end and control the cable infeed so as to position the cable end in a predetermined cable retrieval position. A tubular lance is fed into the pipeline through a second fluid sealing means disposed at the cable exit position, and a grab housed in the nozzle of the lance is ejected to engage and capture part of the centralizing device and cable end, whereafter the grab closes on being drawn back into the lance. The lance is then withdrawn through the second fluid sealing means so as to draw with it the grab and the captured centralizing device and cable end.

14 Claims, 2 Drawing Sheets

PIPELINE SYSTEMS

This invention relates to fluid transportation pipeline systems, for transporting bulk liquids or gases over substantial distances.

Such a system may require the transmission of data and/or control signals from one part of the system to another, in which case cables or lines are provided for transmitting such signals. Such signals generally comprise electrical or optical signals, though in appropriate circumstances they may even comprise hydraulic or pneumatic signals.

Such cables or lines may be buried, or otherwise supported, alongside a pipeline which extends between the locations at which such signals are generated and utilised respectively. Those cables or lines are vulnerable to damage by destructive natural or human forces.

According to one aspect of the present invention, such cables (or lines) are deployed within the pipeline itself, instead of alongside it, each such cable entering the pipeline through an inlet fluid sealing means, and leaving the pipeline through an outlet fluid sealing means.

According to another aspect of the present invention, such a cable is deployed inside the pipeline whilst it continues in normal operation, full of and transporting a fluid under pressure, by a method which comprises the steps of:

(a) attaching a collapsable drogue or other centralising device to the leading end of a cable, (b) introducing the drogue and attached cable into the pipeline through a fluid sealing means at an upstream inlet position thereon, (c) feeding the cable at a controlled rate into the pipeline and allowing the cable to be carried along by the fluid flowing in the pipeline, with its leading end centralised in the pipeline by the drogue as it is carried downstream by the fluid entrained behind it, (d) extracting the drogue and attached cable end through a fluid sealing means disposed at a downstream exit position on the pipeline; and (e) securing the cable against movement at said inlet and exit positions in the respective cable sealing means.

The above method may also comprise the steps of sensing the arrival of the drogue and attached cable end at a predetermined downstream position and thereupon temporarily halting the passage of the cable into the pipeline at the upstream inlet position; inserting a cable grabbing device into the pipeline through said downstream fluid sealing means; operating the cable grabbing device so as to cause it to engage and grip the drogue and cable end; and withdrawing the cable grabbing device through said downstream fluid sealing means so as to withdraw the drogue and attached cable end, whilst paying out further cable into the pipeline at the upstream inlet position.

Said method may also comprise the steps of securing in a fluid-tight manner to an existing pipeline at each of said inlet and outlet positions thereon a respective branch pipe, each such branch pipe being inclined relative to the pipeline at an angle (of approximately thirty degrees) suitable for introducing the cable into the pipeline, or extracting it therefrom respectively, without causing damage to the cable.

Said method may also include the steps of securing permanently to each of said branch pipes a respective fluid-tight isolating valve for providing controlled access to the associated branch pipe; and subsequently in respect of each such branch pipe in turn, the steps of securing to the free side of the valve a fluid-tight drilling mechanism, opening the valve, advancing a rotating drill through said valve and causing it to drill a skewed hole through the wall of the pipeline, withdrawing the drill, closing off the valve, removing the drilling mechanism and securing in its place on the valve a said fluid sealing means and a fluid-tight cable handing mechanism, re-opening the valve and operating the cable handling mechanism either to introduce the leading end of a said cable through said sealing means and valve into the branch pipe at the inlet position, or to extract the leading end of the cable through said valve and sealing means at the outlet position.

Preferably, each branch pipe is provided with a lining sleeve to guide the cable smoothly into and out of the pipeline.

Each such isolating valve preferably comprises a slide valve in which an apertured valve plate is arranged for sliding movement across and between opposed inlet and outlet ports, whereby in one position of the valve plate a passageway is provided between those ports, and in another position those ports are isolated from one another.

Other features of the present invention will be apparent from a reading of the description that follows hereafter and of the claims that are appended at the end of that description.

Figure 2:
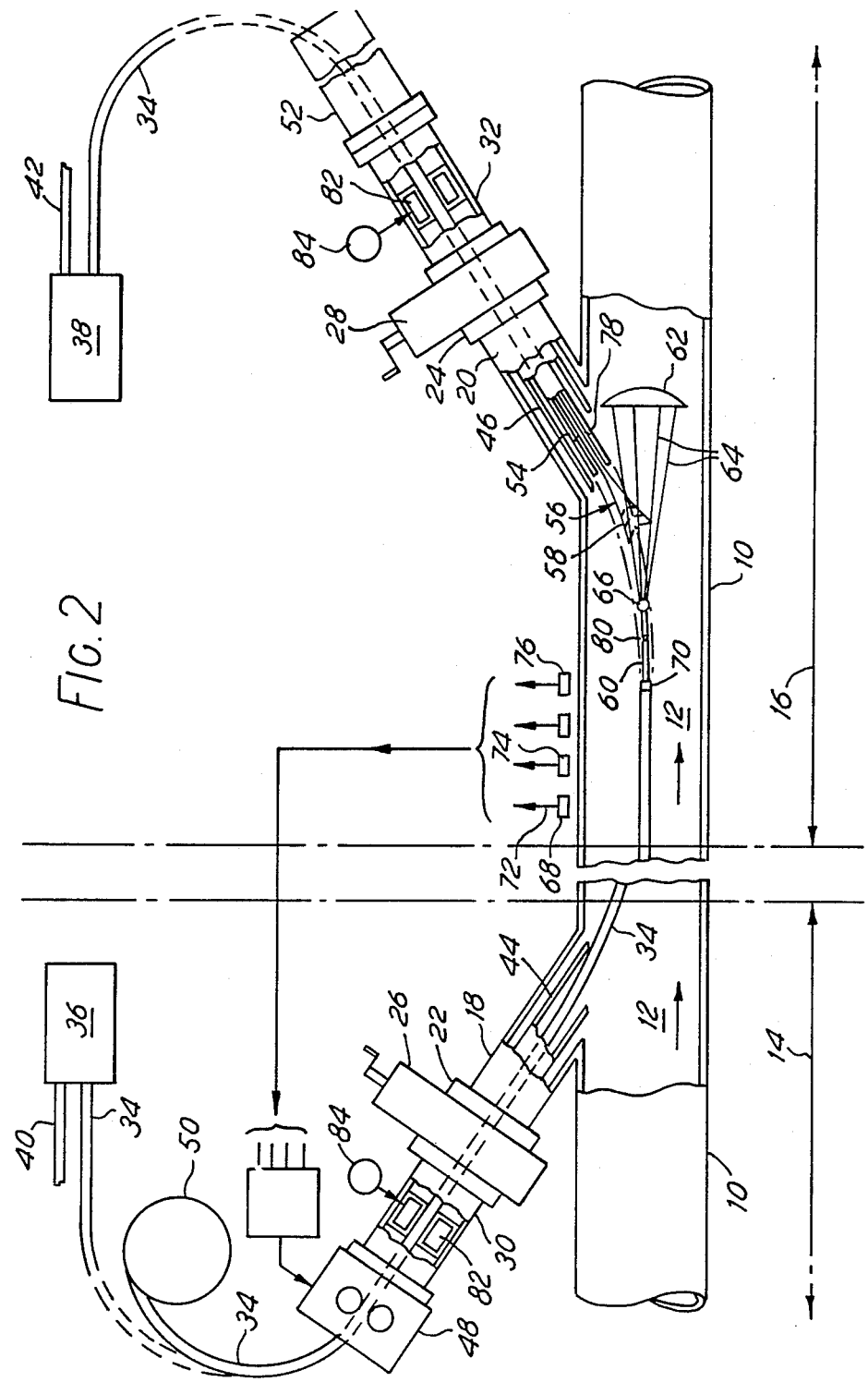

One embodiment of the present invention and various modifications thereof will now be described by way of example and with reference to the accompanying diagrammatic drawings in which:

FIG. 1 shows a diagrammatically in side elevation a pipeline incorporating a cable in accordance with the present invention; and FIG. 2 shows, in a view similar to that of FIG. 1 but on a slightly larger scale, the apparatus necessary for deploying the cable in the pipeline.

Referring now to the drawings, a pipeline 10 transports bulk fluid 12 (such as water or oil) under a high positive pressure (of the order of 1440 or more pounds per square inch (approximately 99.6 bar)) from left to right as seen in FIG. 1, and at a predetermined flow rate (about 2 metres per second) between a fluid supply location 14 (referred to hereinafter and the 'upstream location') and a fluid delivery location 16 (referred to hereafter as the 'downstream location'), which locations are situated many miles apart, even up to 100 miles or more apart.

At each of those locations, the pipeline 10 is provided with a branch pipe 18, 20, angled relative to the pipeline at a preferred angle of approximately 30° and having a fixing flange 22, 24. Secured on each such flange in a fluid-tight manner is a manually-operable isolating valve 26, 28 (preferably a slide valve), and to the free side of that valve is secured (in a fluid-tight manner) a fluid sealing unit 30, 32.

An electric cable 34 extends from a terminal unit 36 at the upstream location 14 to a similar terminal unit 38 disposed at the downstream location 16 via the respective sealing units 30, 32, the respective isolating valves 26, 28, the respective branch pipes 18, 20, and the pipeline 10 itself. At the respective terminal units 36, 38 the cable 34 connects with similar cables 40, 42 associated, for example, with adjacent pipelines or sections of pipeline.

The cable 34 is protected against mechanical damage at the respective points of entry into and exit from the pipeline by tubular guide sleeves or liners 44, 46 which are secured in the respective branch pipes, project a minimal distance into the pipeline itself, and have angled and smoothly finished free ends.

The cable 34 is deployed in the pipeline 10 whilst the flow of liquid under normal pressure in the pipeline continues.

This is achieved by the apparatus and the method which are described below.

For the purpose of installing the cable 34 in the pipeline the following apparatus is installed temporarily on the pipeline:

(a) at the upstream location 14, a cable driving mechanism 48 is attached temporarily to the fluid sealing unit 30, and is arranged to drawn cable from a supply reel 50 and to feed it via the fluid sealing unit 30, the opened isolating valve 26, and the inlet branch pipe liner 44 into the pipeline 10; and (b) at the downstream location 16, a cable withdrawing mechanism 52 is attached temporarily to the fluid sealing unit 32, and incorporates a linear tubular element or lance 54 which carries internally in its free end or nozzle a cable grab 56. That mechanism 52 is operable to advance the lance and enclosed cable grab as required into the pipeline 10 via the fluid sealing unit 32, the opened isolating valve 28, and the branch pipe liner 46, and subsequently to withdraw the lance and cable grab as required. That mechanism also includes means (not shown) for advancing the cable grab 56 from within the lance nozzle into the pipeline, and for opening and closing its jaws 58 as required.

To deploy such a cable 34 in the pipeline 10, the following procedure is followed:

(i) a flexible connector 60 is secured to the leading end of the cable, and after threading that connector through the cable driving mechanism 48, a collapsed fabric drogue 62 is attached to the connector by a plurality of drogue strings 64 and a swivel connection 66;

(ii) the drogue and attached cable end are then fed through the fluid sealing unit 30 and, after opening the isolating valve 26, into branch tube liner 44, and thence into the fluid flowing in the pipeline 10. There the flow of fluid past the collapsed drogue causes it to open up, become centrallised in the pipeline bore, and be urged along by the fluid entrained behind it;

(iii) the cable driving mechanism 48 is then caused to exert a controlled driving or braking action (as required) on the cable being fed into the pipeline, so as to control in a desired manner the progress of the drogue and attached cable end along the pipeline;

(iv) on arrival of the drogue at the downstream location 16, a first magnetic sensing device 68 mounted alongside the pipeline 10 detects the presence of a magnet 70 carried by the cable connector 60 and thereupon emits a control signal 72, which on being relayed to the upstream location 16 results in the halting of the cable driving mechanism 48 and of the paying in of further cable from the supply reel 50;

(v) after the now-stationary cable has settled in the pipeline, the driving mechanism is caused to pay in slowly further cable, and is subsequently stopped on detection of the drogue magnet by a second magnetic sensing device 74 situated a short distance downstream of the first sensing device 68. Further similar steps of slowly paying in further small amounts of cable are executed until on detection of the drogue magnet by a final magnetic sensing device 76, the cable is halted with the drogue and cable end in predetermined retrieval positions adjacent the free end of the branch pipe liner 46;

(vi) on receipt of such a control signal from the final sensing device 76, the cable withdrawing mechanism 52 is caused to advance the lance 54 and enclosed grab 56 into the pipeline through the fluid sealing unit 32, the opened isolating valve 28, and the branch pipe liner 46, and then to project the grab 56 form the lance nozzle and open the grab jaws 58 whereby to cause them to intercept the strings 64 of the now-stationary drogue;

(vii) the withdrawing mechanism 52 is then caused to close and retract the grab jaws 58, thus engaging them with one or more of the drogue strings 64, drawing the collapsing drogue into the lance nozzle, and finally engaging the cable connector 60 positively in the lance nozzle, where it is held by spring-loaded pawls 78 which engage in an annular groove 80 formed in the cable connector;

(viii) the withdrawing mechanism 52 is next caused to retract the lance and then withdraw it and the attached cable end through the branch pipe liner 46, the isolating valve 28, and the fluid sealing unit 32. The lance and cable end have the same external diameters so as to enable the cable to pass into and through the fluid sealing unit 32 without difficulty and without any substantial loss of fluid from the pipeline. The cable driving mechanism 48 is caused to feed in additional cable as the lance 54 withdraws the cable end from the pipeline;

(ix) the cable connector 60 is then detached from the lance, and the cable is reconnected with the withdrawing mechanism, which is then operated to draw further cable through the pipeline 10 with or without the assistance of the cable driving mechanism 48; and (x) the cable driving and withdrawing mechanisms 48 and 52 are then uncoupled from the respective fluid sealing units 30, 32, and the cable ends are trimmed and carried into the respective terminal units 36, 38.

The above-described method and apparatus may be used for installing any form of cable or line in a pipeline whilst it continues to transport bulk fluids at substantial working pressures. Such a cable may be arranged for the transmission of any form of control or data signal, e.g. electrical or optical. Even hydraulic or pneumatic control lines may be deployed in the described manner in a pipeline.

Whilst the method described above is readily employed on pipelines which are already equipped with suitable branch pipes appropriately angled relative to the pipeline, the method may also be employed on any existing pipeline, by first equipping the pipeline with suitable branch pipes at respective upstream and downstream locations.

The reader's attention is hereby directed to our concurrently filed, co-pending patent application No. . . . (our reference 3113) which discloses a means and a method for enabling the invention of this application to be applied to existing pipelines.

Each of the fluid sealing units 30, 32 may incorporate as a fluid sealing means, an inflatable annular collar 82 through the centre of which the cable is drawn. That collar is inflated hydraulically from a source 84 to a pressure sufficient to allow movement of the cable through the collar without permitting any appreciable egress of fluid. Further inflation of the collar will result in a complete seal of the cable when it is stationary. Other sealing rings may be applied around the cable to provide a leakless fluid seal after the drawing-in of the cable has been completed, at which time the hydraulic inflation of the sealing collar may be exhausted if desired, until the next occasion on which the cable is to be adjusted or withdrawn from the pipeline.

In some instances, and/or at some times, the drogue 62 may contribute substantially to the effort necessary to draw the cable into the pipeline, whilst in other cases, and/or at other times, it contributes in only a small way. In either case, the drogue serves the important function of holding the leading end of the cable substantially centrally within the bore of the pipeline, so that that cable end cannot foul any irregularity present in the bore of the pipeline as the cable is advanced along the pipeline.

Moreover, the drogue provides a relatively simple means for locating the leading end of the cable in a position suitable for retrieving the cable at the downstream exist location. Furthermore, the drogue and drogue strings provide a simple means for engaging and securing a hold on the cable end as a preliminary to drawing the cable end into the cable guide 46 at the exit location. The flexible connector 60 secured between the cable end and the swivel connection 66 serves to facilitate the entrance of the cable into the exit branch pipe liner 46 when the cable end is being withdrawn by the lance into that liner.

Where a very long pipeline is sub-divided at intervals into discrete sections by valves, it is necessary for any such cable 34 to leave the pipeline 10 upstream of each such valve via an exit branch pipe 20 and associated equipment, and to re-enter the pipeline downstream of each such valve via an inlet branch pipe 18 and associated equipment. The cables installed in adjacent sections of a pipeline are connected together at the aforementioned terminal units 36, 38.

Moreover, for any pipeline system, the maximum length of cable available in one piece will determine the positions of associated inlet and outlet branch pipes 18, 20. Successive separate lengths of cable 34 drawn into successive sections of a pipeline through respective pairs of associated inlet and outlet branch pipes are inter-connected to provide a continuous cable circuit running the whole length of the pipeline.

The drogue device may be replaced, if desired, by any other device that will effectively hold the leading end of the cable in a central position in the pipeline bore. For example, a collapsible umbrella-like frame having resilient spokes radiating from a central shaft and biased to the open position may be used. Such spokes may incorporate, for example, barbs for assisting in retrieval of the cable end by the grab 56, 58.

The grab jaws 58 may be resiliently biased to the open condition, so that they open automatically when the grab is advanced into the pipeline, and are closed automatically on being withdrawn back into the lance. (38:sp-bp05f)

What is claimed:

1. A method of deploying a cable or other line associated with a fluid transportation pipeline, which method comprises the following steps performed whilst the pipeline continues in normal operation full of and transporting a fluid under a positive pressure:
    (1) introducing the leading end of the cable into the pipeline at an upstream cable inlet position, and at an acute angle to the fluid flow direction, through a first fluid sealing means connected to the pipeline at that inlet position;
    (2) feeding the cable into the pipeline until the leading end reaches a predetermined downstream cable exit position; and
    (3) extracting the leading end of the cable from the pipeline at an acute angle to the fluid flow direction through a second fluid sealing means connected to the pipeline at that cable exit position.

2. A method according to claim 1, wherein -
    (a) prior to step (1), a collapsible cable-centralising device is attached at the leading end of the cable;
    (b) said step (1) includes introducing the centralising device in a collapsed state into said first fluid sealing means ahead of the leading end of the cable, said centralising device expanding automatically from the collapsed state into an open state when in the pipeline whereby to hold the cable end centralised within the transverse cross section of the pipeline during step (2);
    (c) said step (2) includes detecting the approach of the leading end of the cable to a predetermined position upstream of the cable exit position and thereafter controlling the infeed of the cable into the pipeline so as to arrest the leading end of the cable in a predetermined cable retrieval position adjacent the second fluid sealing means; and
    (d) said step (3) includes -
        (i) advancing a tubular cable-retrieval lance into the pipeline through the second fluid sealing means so as to position the free end of the lance in the pipeline adjacent the stationary centralising device and attached cable end,
        (ii) advancing from within the free end of the lance a cable grab towards the centralising device and attached cable end,
        (iii) operating the grab so as to engage and capture at least a part of the centralising device and cable end,
        (iv) withdrawing the grab from the pipeline into the tubular lance so as to draw the centralising device and cable end into the tubular lance, and
        (v) withdrawing the lance through the second fluid sealing means so as to advance the centralising device and cable end through the second fluid sealing means whilst feeding the cable further into the pipeline through the first fluid sealing means.

3. A method according to claim 2, wherein the centralising device is attached to the leading end of the cable via a socket which is secured to the cable end and incorporates a swivel connector to which said centralising device is secured.

4. A method according to claim 3, wherein the socket is flexible.

5. A method according to claim 2, wherein the centralising device expands to the open conditions under the influence of the fluid flowing in the pipeline.

6. A method according to claim 5, wherein the centralising device comprises a drogue having a collapsible canopy connected with the cable end by a plurality of strings.

7. A method according to claim 2, wherein the centralising device comprising a collapsible array of radial spokes which radiate from a central member and are resiliently biased outwardly to an open condition relative to said member.

8. A method according to claim 2, wherein the grab comprises a plurality of jaw members which open in radial directions and have inwardly pointed barbs for engaging with the centralising device and attached cable end.

9. A method according to claim 8, wherein the jaw members are resiliently biased to an open condition and open automatically when the grab is advanced from the free end of the tubular lance, and are closed together automatically on return of the grab into the free end of the lance.

10. A method according to claim 1, wherein a magnetic device is secured to the leading end of the cable, and magnetic sensing means are mounted alongside the pipeline and constitute a means for detecting the said approach of the leading end of the cable.

11. A method according to claim 2, wherein said tubular lance includes in its said free end a pawl device arranged for engagement in a grooved part of the cable end, whereby to securely hold the cable end in the free end of the lance during the withdrawal of the lance through the second fluid sealing means.

12. A method according to claim 1, wherein said said fluid sealing means is connected to the pipeline in a fluidpressure tight manner via an isolating valve and a branch pipe which is secured to the pipeline at a said acute angle, and wherein said isolating valve at the upstream cable inlet position is opened only after introduction of the centralising device and attached cable end into the first fluid sealing means, and said isolating valve at the downstream cable exit position is opened only after the introduction of the cable retrieval lance into the second fluid sealing means.

13. A method according to claim 12, wherein each said branch pipe incorporates coaxially within it a cable guide tube through which the cable is intended to pass during deployment of the cable, and wherein each such guide tube has a free end which projects into the pipeline and which is angled and smoothed so as to minimise damage to the cable on being fed into the pipeline at the cable inlet position and on being drawn out of the pipeline at the cable exit position.

14. A fluid transportation pipeline having associated therewith a cable or other line, which cable or other line has been deployed in the pipeline by a method according to claim 1.

* * * * *